United States Patent [19]
Bell, III

[11] 3,981,011
[45] Sept. 14, 1976

[54] OBJECT IDENTIFICATION SYSTEM USING AN RF ROLL-CALL TECHNIQUE

[75] Inventor: William W. Bell, III, Bayside, N.Y.

[73] Assignee: Sperry Rand Corporation, New York, N.Y.

[22] Filed: Mar. 31, 1975

[21] Appl. No.: 564,002

[52] U.S. Cl. ..................... 343/6.5 LC; 343/6.5 SS
[51] Int. Cl.² ........................................... G01S 9/56
[58] Field of Search ........ 343/6.5 R, 6.5 LC, 6.5 SS

[56] References Cited
UNITED STATES PATENTS

| | | | |
|---|---|---|---|
| 3,270,338 | 8/1966 | Watters | 343/6.5 SS |
| 3,341,845 | 9/1967 | Deman | 343/6.5 LC |
| 3,706,094 | 12/1972 | Cole et al. | 343/6.5 SS |
| 3,774,205 | 11/1973 | Smith et al. | 343/6.5 SS |
| 3,859,624 | 1/1975 | Kriofsky et al. | 343/6.5 SS X |
| 3,878,528 | 4/1975 | Majeau | 343/6.5 SS |

Primary Examiner—T.H. Tubbesing
Attorney, Agent, or Firm—Howard P. Terry

[57] ABSTRACT

An object identification system using an RF roll-call technique wherein an interrogator illuminates a multitude of cooperating objects with a sequence of codes and receives from each such cooperating object an acknowledge signal immediately following the transmission of the code associated with that object and which terminates prior to completion of transmission of the next code in the sequence.

13 Claims, 7 Drawing Figures

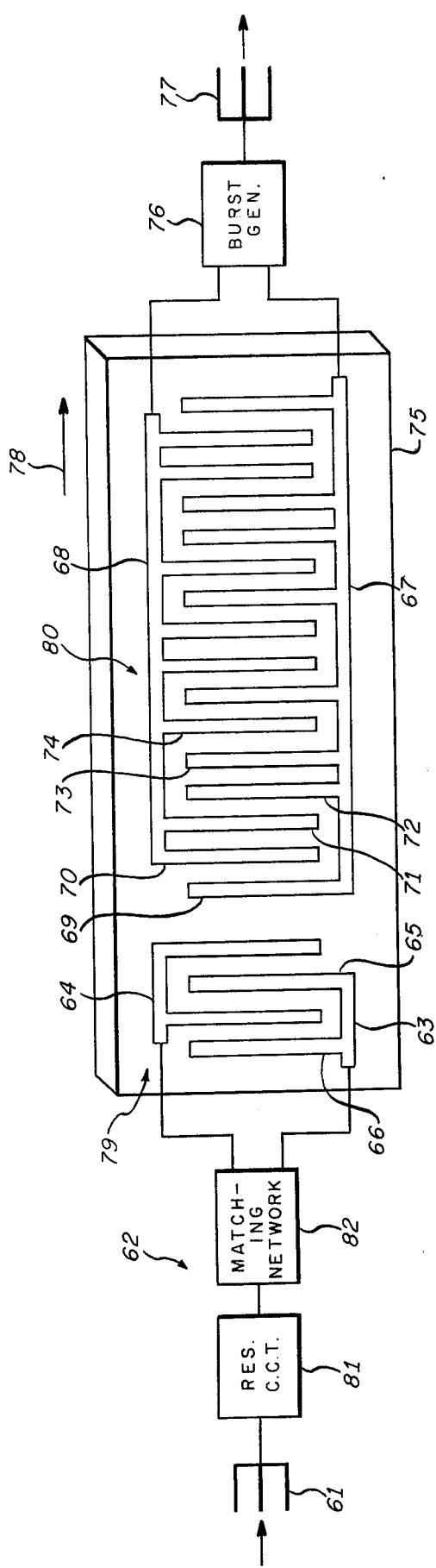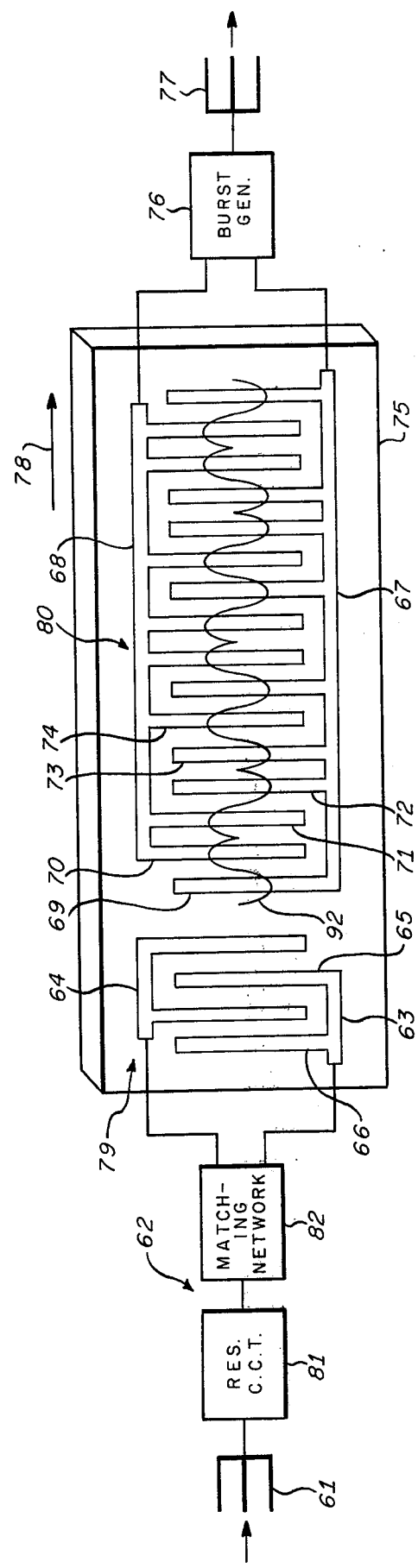

OBJECT IDENTIFICATION SYSTEM USING AN RF ROLL-CALL TECHNIQUE

BACKGROUND OF THE INVENTION

1. Field of the Invention

The invention pertains to object identification systems and more particularly to a novel system for identifying objects with coded labels using a continuous wave radio frequency roll-call technique.

2. Description of the Prior Art

The label identification systems presently in use are subject to a number of limitations. The systems employing optical techniques are adversely affected by environmental limitations including deterioration of the label and interference of operation in bad weather conditions. A typical optical system is described in U.S. Pat. No. 3,744,026 entitled "Optical Label Scanning". The operation of this system and other optical systems is further limited in that the cooperating objects are required to move in a uniform single file procession over a narrowly-defined path past a scanner.

Prior art label identification systems employing RF techniques have overcome the limitations of the optical systems due to environment. These systems illuminate the cooperating labelled object and receive from the labelled object a complex signal containing a label identification. Due to the complex nature of this signal received from the labels by the interrogating units, these systems, similar to the optical systems, are limited by the requirement that the cooperating labelled objects proceed past the interrogator in an uniform single file procession and further limited by the complexity of the interrogators necessary to decode the signals received from the labels. One such system is described in U.S. Pat. No. 3,247,508 entitled "Microwave Identification of Railroad Cars". In this system, railroad cars have affixed thereto a coded reflector plate into which are cut a series of dipole slots disposed at angles of ±45° from a vertical axis. These slots are illuminated with a microwave signal and reflect back to a receiving antenna at the interrogator a series of polarized microwave signals which form the code for each label.

Another such RF identification system is described in U.S. Pat. No. 3,209,350 entitled "Identification Interrogation System". In this sytem, the device to be identified consists of a plurality of piezoelectric elements having different preselected frequency responses. As each such identification device passes an interrogator, signals are transmitted over a preselected frequency range from the transmitting antenna at the interrogator. Signals at the same frequencies of the piezoelectric elements connected in the identification device are repeated by the identification device, transmitted to the receiving antenna at the interrogator, and decoded to indicate the identity of the object.

Still another system employing an RF identification system is described in U.S. Pat. No. 3,406,391 entitled "Vehicle Identification System". In this system, the objects to be identified have affixed thereto a transponder assembly. As the transponder passes the interrogator, it is illuminated with electromagnetic radiation consisting of a series of discrete carrier frequencies each of which is amplitude modulated by one of a plurality of modulating frequencies. The transponder consists of series of frequency responsive devices which when illuminated by the interrogator will receive the series of carrier frequencies, demodulate each such carrier frequency, and selectively radiate a plurality of the demodulating frequencies in sequential order back to the interrogating unit.

It can therefore be appreciated that these prior art RF identification systems have failed to overcome the limitations enumerated above and are, therefore, limited in their application and limited by their complexity.

SUMMARY OF THE INVENTION

The invention comprises a system for identifying a multitude of cooperating objects by illuminating the cooperating objects simultaneously with an electromagnetic illumination containing a sequence of codes. The electromagnetic illumination is received by each object simultaneously, and the sequence of codes is separated from the carrier frequency. Each object then compares each code in the sequence of codes with a preselected code contained within the object. When a match between a code in the sequence and this preselected code is detected, an acknowledge signal, which may be identical for each object, is transmitted to the interrogator. The acknowledge signal from each cooperating label immediately follows the transmission of the code from the interrogator assocated with that object and terminates prior to the completion of transmission of the next code in the sequence.

BRIEF DESCRIPTION OF THE DRAWINGS

FIG. 3 is a diagram of an additional embodiment of an object employing a different mode of operation from that depicted in FIG. 2 and illustrating in part the physical characteristics thereof.

FIG. 4 is a diagram illustrating graphically the physical operation of the object circuitry of the configuration of FIG. 3.

DESCRIPTION OF THE PREFERRED EMBODIMENT

Figure 1:
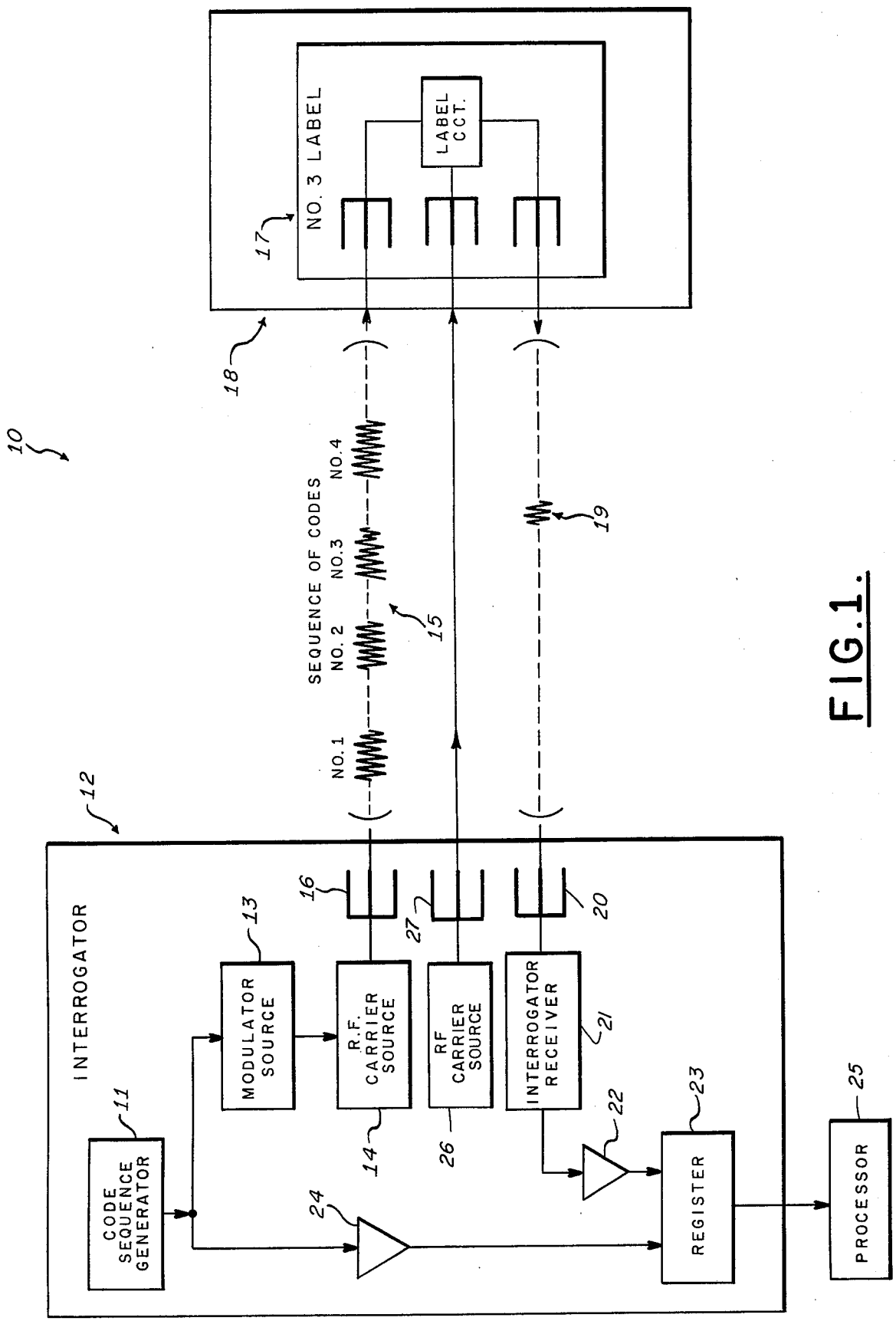
FIG. 1 is a block schematic diagram of an interrogator and depicts the operation of a system incorporating the invention.

FIG. 1 illustrates an object identification system 10 in operation which incorporates the invention. The interrogator 12 illuminates a group of cooperating objects with an electromagnetic radiation containing a sequence of codes, and in response thereto, receives and identifies the acknowledge signals radiated from the cooperating objects. While the invention, as it relates to the objects to be identified, will be described in the form of a label containing the circuitry and affixed to the object to be identified, it will be appreciated that the invention is not limited thereto but instead may encompass a form wherein the circuitry is incorporated directly into the object or into a package or container housing the object or any other suitable means.

The code sequence generator 11 is programmed with a plurality of binary code sequences. The correct code sequence is selected from the code sequence generator 11 and coupled to the modulator source 13. Modulator source 13 and the code sequence generator 11 cooperate to produce a binary coded sequence with which to modulate the RF carrier source 14. The RF carrier source 14 so modulated, generates an RF illumination containing the sequence of codes 15. This illumination is coupled to antenna 16, which is preferably directional, and radiated in the direction of the cooperating labelled objects 18.

The coded label or transponder 17 and the object 18 to be identified receives the sequence of codes and compares each code in the sequence with its preselected code. When a match is detected, an acknowledge signal 19, comprising a burst of continuous wave RF illumination, is generated by the label and transmitted to the interrogator 12. The acknowledge signal generated by the label must be relatively brief in time duration compared to the length of a code in a sequence and must be terminated prior to the completion of transmission of the next code in the sequence. Furthermore, the frequency of the acknowledge signal preferably should differ from that of the signal generated by the RF carrier source 14 at the interrogator 12.

The acknowledge signals generated by the cooperating labelled objects are received by antenna 20 and coupled to interrogator-receiver 21. Interrogator-receiver 21 comprises a resonant circuit, tuned to the frequency of the acknowledge signals, and a filter. Since identification of a cooperating labelled object is dependent on the time of receipt of the acknowledge signal rather than a code contained therein, the acknowledge signal from each and every label interrogated in a sequence can be identical. Therefore, the resonant circuit of interrogator-receiver 21 should be sharply tuned with a narrow passband to prevent erroneous identification of labels due to transient noise, etc. The output from this resonant circuit is filtered, and then coupled to gate 22. Gate 22 is an inverter gate which acts as a waveshaper providing the output from receiver 21 with a waveform having steep slopes at the transition points and, additionally, provides an impedance matching function, if needed, between the receiver circuit 21 and register 23.

The code sequence generated by code sequence generator 11 is coupled to register 23 through inverter gate 24 which performs a function similar to that of gate 22. Therefore, the output from the interrogator-receiver is associated with the code in the sequence whose transmission immediately preceded receipt of the acknowledge signal. The output of the register is coupled to a processor 25 or similar unit for processing and recording of the label identifications. In this manner, that is, transmitting code 1, receiving an acknowledge signal from label 1, generating code 2, receiving an acknowledge signal from label 2, etc., a roll-call technique is effected.

Figure 2:
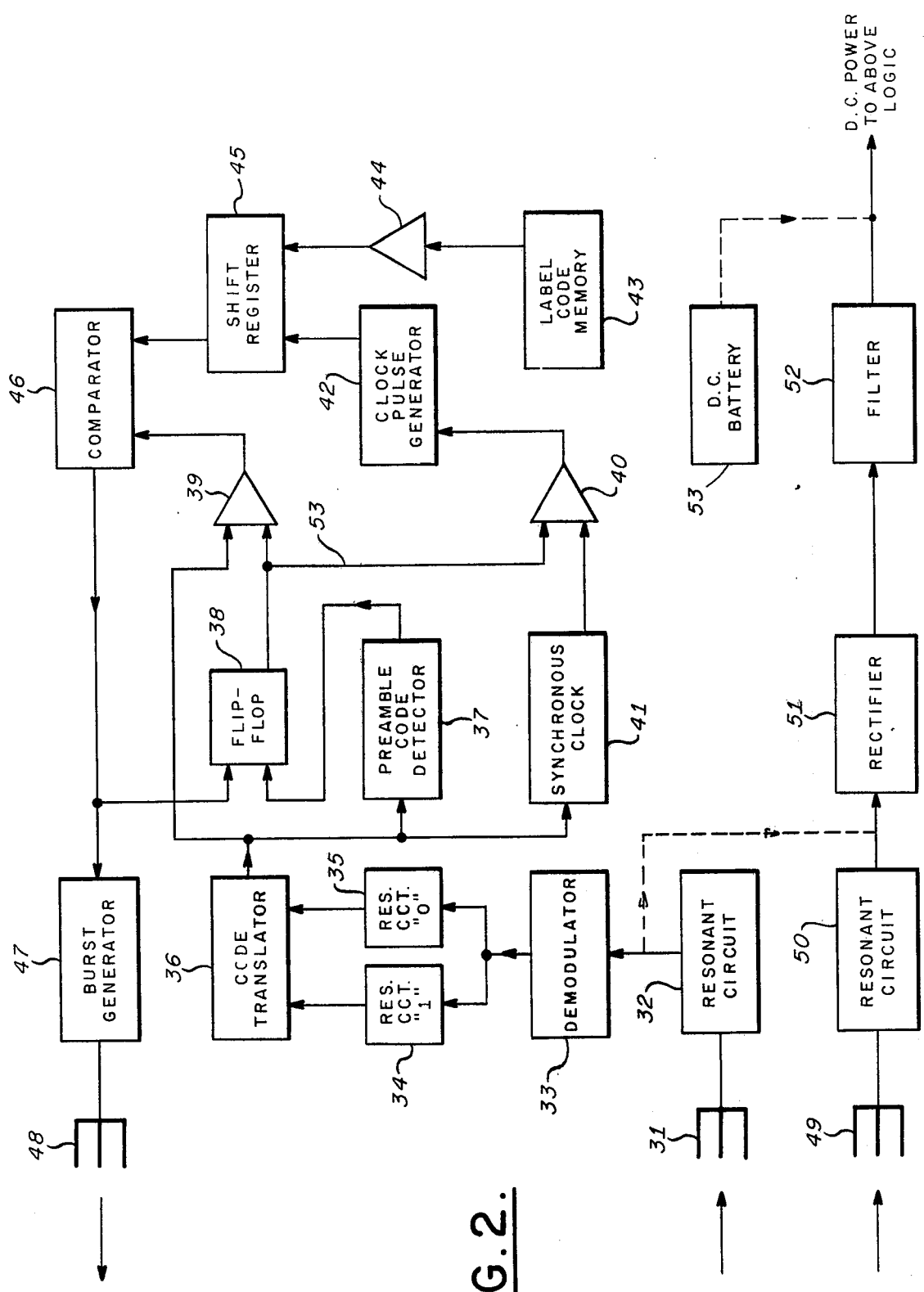
FIG. 2 is a block diagram of an embodiment representing the circuitry of a cooperating object.

FIG. 2 describes an object label or transponder in accordance with the invention. The binary coded illumination radiated by the interrogator 12 is received by antenna 31 which is preferably omni-directional. The binary coded illumination may consist of a carrier signal amplitude modulated alternately by two modulating signals of different frequencies generated by the modulator source 13 in cooperation with the code sequence generator 11. One of the modulating frequencies represents a binary ONE while the remaining modulating frequency represents a binary ZERO. Antenna 31, similar to all the label antennas discussed herein, consists of a dipole photoetched on a printed circuit or fabricated by any suitable means on the substrate containing the label circuitry.

The binary coded illumination collected by antenna 31 is coupled to resonant circuit 32, which is tuned to the carrier frequency of the binary coded electromagnetic illumination. The resonant circuit should have a high Q but remain sufficiently broadbanded to accommodate the sidebands of the amplitude modulated binary coded illumination. The output from resonant circuit 32 is coupled to demodulator 33. Demodulator 33 separates the carrier frequency from the signal modulating frequencies and couples the signal modulating frequencies to resonant circuits 34 and 35. Resonant circuit 34 is tuned to the modulating signal frequency representing binary ONE. Similarly, resonant circuit 35 is tuned to the modulating signal frequency representing binary ZERO. The outputs from resonant circuits 34 and 35 are coupled to code translator 36. Code translator 36 translates the signals received from resonant circuits 34 and 35 into binary digital form.

The output from code translator 36 is coupled to preamble code detector 37. The preamble code detector operates to detect a preamble code which precedes each sequence of codes. Use of a preamble code provides a means for the label to accurately synchronize the recirculation of its preselected code to the code bit rate of the incoming binary coded illumination. The preamble code should be easily distinguished from any code in the sequence and simply detected. A typical preamble code may consist of a plurality of binary ONE bits greater than the maximum number of bits in any code in a sequence. For example, if the number of objects in a sequence to be identified is 1,000,000, then a 20 bit code would be required to identify each and every label in that sequence. The preamble code in this instance might consist of 30 binary ONE bits. An alternative to preceding each sequence of codes by a preamble code is preceding each code in the sequence by a preamble code. However, this method is not practical for the most part since a considerable amount of extra time will be consumed in the preamble identification process.

When the preamble code detector 37 detects the proper pre-signal code, an output signal pulse is generated and directed to flip-flop 38, causing the output line 53 of flip-flop 38 to change state. The change of state of output line 53 enables gates 39 and 40.

The output of code translator 36 is also coupled to synchronous clock 41. Synchronous clock 41 generates an output signal accurately synchronized to the code bit rate of the incoming binary coded illumination. While gate 40 is enabled, the output from synchronous clock 41 is coupled through gate 40 to clock pulse generator 42. Clock pulse generator 42 recirculates the internal label code contained in label code memory 43 into shift register 45 through gate 44 which provides impedance matching therebetween. From shift register 45, the binary coded label code is coupled to comparator 46.

The output of code translator 36 is further coupled to gate 39. While gate 39 is in the enabled state, the binary coded digital information emanating from code translator 36 is coupled through gate 39 and into comparator 46. Comparator 46 compares each code contained in the incoming sequence of codes with the recirculated label code from the label code memory. When an exact match is detected, comparator 46 generates an output pulse which is coupled to burst generator 47 and flip-flop 48.

Burst generator 47 when actuated by the output pulse from comparator 46 produces a burst of continuous wave RF energy of a different frequency than the carrier frequency of the incoming binary coded illumination. This RF energy is coupled to antenna 48, which is preferably omni-directional and transmitted back to interrogator 12. This burst of RF energy constitutes the acknowledge signal for this label and must be shorter in time duration than any code contained in the sequence of codes received by the label.

The output pulse from comparator 46 is also directed to flip-flop 38. This pulse acts to reset flip-flop 38 causing output line 53 to change state again and thereby return to its original state. The return of output line 53 to its original state disables gates 39 and 40. Gates 39 and 40 will remain disabled until the preamble code detector 37 once again detects the correct pre-signal code.

Power for the label circuitry is provided by the interrogator 12. Antenna 49 receives a continuous wave RF illumination transmitted by the interrogator. The illumination collected by antenna 49 is coupled to resonant circuit 50. Resonant circuit 50 is tuned to the frequency of this illumination and should be designed with a high Q. The output from resonant circuit 50 is coupled to rectifier 51 which in cooperation with filter 52 rectifies and filters the output from resonant circuit 50 to provide d.c. power for the label circuitry. For this operation, the continuous wave RF illumination collected by antenna 49 may differ from the binary coded illumination generated by RF carrier source 14 and, if so, interrogator 12 would include a second RF carrier source 26 and a second antenna 27 (as depicted in FIG. 1) for the express purpose of providing d.c. power to the label circuits. As an alternate to this configuration, the energy contained in the binary coded illumination might serve to provide this d.c. power, if sufficient energy is generated therein. If this approach were incorporated, antenna 49 and resonant circuit 50 could be eliminated if the output of resonant circuit 32 is coupled to rectifier 51 in addition to demodulator 33. Further, the need for a second RF carrier source and a second antenna within the interrogator 12 would be eliminated.

Another alternative label power supply, suitable for many applications, is a self-contained battery 53, in which case antenna 49, resonant circuit 50, and rectifier 51 would be eliminated.

The label circuitry, as depicted in FIG. 2, can be fabricated on a substrate using integrated circuit techniques. The circuitry should be protected from the environment, etc. by a covering composed of a material transparent to the electromagnetic radiation of the frequencies to be employed, such as plastic radome. The physical size of the entire label can be constructed with an area less than the size of an 8½ × 11 sheet of paper and with a depth of a fraction of a centimeter.

FIG. 3 illustrates a completely different label or transponder configuration from that of FIG. 2 in accordance with the invention. For this label configuration, the binary coded illumination may consist of an RF carrier which is phase modulated. The binary coded illumination is collected by antenna 61. The collected illumination is coupled from antenna 61 to receiver circuit 62. Receiver circuit 62 comprises a resonant circuit 81 of high Q tuned to the carrier frequency of binary coded illumination and further consists of a matching network 82 which provides proper matching between the resonant circuit and the launching transducer 79. The output of the receiver circuit is coupled then to launching transducer 79.

The launching transducer 79 consists of a pair of very thin film electrodes 63 and 64 with a cooperating array of respective inter-digital fingers. Electrodes 63 and 64 can be made of any conducting material such as gold or aluminum, and fabricated upon a substrate 75 comprised of a material having piezoelectric properties, such as $LiNbO_3$ (lithium niobate) using standard photoetching and photoresist masking or other suitable techniques. The adjacent fingers of either electrode such as fingers 65 and 66 are spaced one acoustic wavelength apart at the corresponding operating carrier frequency of the incoming binary coded illumination. The electrode configuration comprising electrodes 63 and 64 behaves as an end-fire antenna array causing a surface acoustic wave to propagate in the direction arrow 78 when driven by a signal from receiver circuit 62. See U.S. Pat. No. 3,833,867 entitled "Acoustic Surface Wave Convolver with Bidirectional Amplification", issued to Leland P. Solie and assigned to the assignee of the present invention for a more detailed discussion of active surface technology.

The comparison between the internal label code and the sequence of codes contained within the binary coded illumination is performed by the decoder 80. The decoder is comprised of two electrodes 67 and 68 which consist of an operating array of inter-digital fingers. Electrodes 67 and 68 are fabricated in a manner similar to electrodes 63 and 64 on the same substrate. The fingers of electrodes 67 and 68 are combined in pairs to compare the codes, each pair consisting of one finger from electrode 67 and one finger from electrode 68. For example, fingers 69 and 70 form one pair with which to correlate one bit of a code. In a similar manner, fingers 71 and 72 form a second pair, fingers 73 and 74 form a third pair, etc. Each finger, is spaced one-half acoustic wavelength from the preceding and succeeding fingers in the decoder. For example, finger 70 is spaced one-half acoustic wavelength from finger 69 and spaced one-half acoustic wavelength from finger 71. The order of succession for the fingers of electrodes 67 and 68 varies from label to label in accordance with desired code to be detected. For example, if the finger pair comprising fingers 69 and 70 represents a binary ZERO, then finger pair comprising fingers 71 and 72 represent a binary ONE, fingers 73 and 74 represent a binary ZERO, etc. Therefore, the internal binary code of the label depicted in FIG. 3 is, reading from left to right, 0 1 0 0 1 1 0 1.

The surface wave generated by launching transducer 79 propagates along the surface of the substrate in the direction of arrow 78. As this surface wave transverses the substrate, the electric fields created by this propagation cause electric charges to be collected by the fingers of electrodes 67 and 68. Each finger pair is connected in parallel, and the potential developed across each finger pair is summed by electrodes 67 and 68. The potential developed across electrodes 67 and 68 is coupled to burst generator 76. Burst generator 76 may consist of a resonant circuit which is shock excited from the potential developed across electrodes 67 and 68 and generates a burst of continuous wave RF energy which is coupled to antenna 77. Antenna 77 radiates this burst of RF energy back to the interrogator 12.

Figure 5:
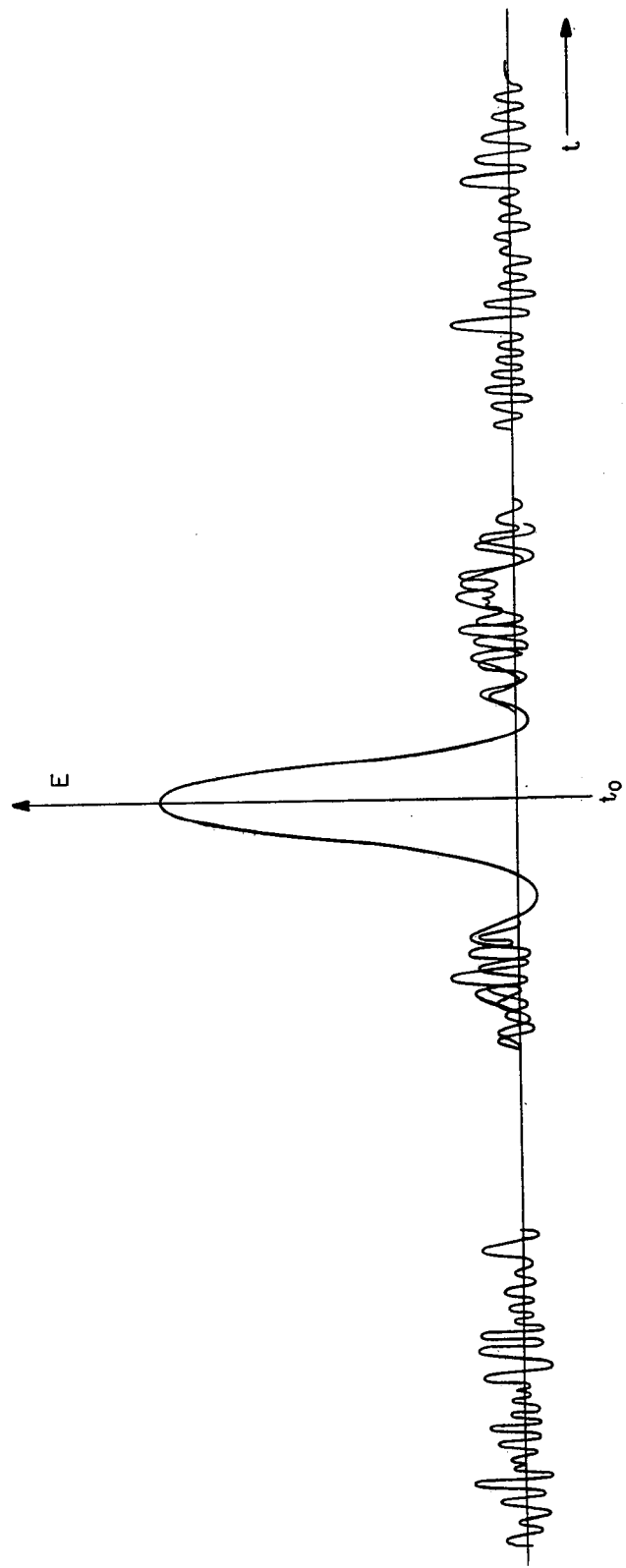
FIG. 5 is a graphical illustration depicting a typical output signal spectrum with respect to time of the comparing circuitry associated with the configuration of FIG. 3.

The operation of the decoder 80 is comparing its preselected internal code to each code in the sequence of codes contained in the binary coded illumination is further described in FIG. 4. FIG. 4 depicts the decoder 80 of FIG. 3 with a phase modulated surface wave 92 representing a code in the sequence contained in the binary coded illumination, propagating in the direction of arrow 78. The binary code depicted in surface wave 92 is 0 1 0 0 1 1 0 1 which identically matches the internal code of decoder 80. Furthermore, the surface wave is shown at that point in time when the surface wave aligns properly with the finger pairs of the decoder 80. At this point, the potential developed across each finger pair will approximate its maximum value. Additionally, the potential developed across each pair will be similarly polarized. Therefore, the total potential developed across electrodes 67 and 68 will be a maximum at this point in time since the potential developed across each pair will add. FIG. 5 depicts graphically the magnitude of the potential with respect to time across the electrodes 67 and 68 while a sequence of codes is being decoded. Time $t_o$ in FIG. 5 coincides with the point in time depicted in FIG. 4.

If the binary code of the surface wave were 1 1 0 0 1 1 0 1 as opposed to the code depicted in surface wave 92, then the potential developed across finger pair 69 and 70 would be approximately equal to that developed for surface wave 92 but opposite in polarity. This polarity reversal of the potential developed across this finger pair would cause a cancellation of a portion of the total potential developed across electrodes 67 and 68. Further, if three or four bits of the code in the surface wave were of the incorrect bit weight, it can be appreciated that there would result therefrom a substantial reduction in the total potential developed across electrodes 67 and 68. By carefully selecting each code in a sequence, a sequence can be generated whereby the potential developed across the electrodes of the decoder 80 for each cooperating label will be inconsequential at all times except when the proper code is detected. To this extent, the burst generator 76 can be further designed to incorporate a threshold detection circuit wherein the burst generator is made insensitive to the potential developed across the electrodes of the correlator except at the time when the correct code is detected.

The label configuration represented in FIG. 3 is fabricated on a substrate using standard integrated circuit techniques. The launching transducer and the correlator are deposited on a section of the substrate composed of a piezeoelectric medium using photoetching and photoresist masking or other sutiable technique. The physical dimensions of the label are similar to those of the label configuration represented by FIG. 2 and a suitable protective covering such as plastic radome should be employed to provide evironmental protection for all the label circuitry in addition to the antennas.

The label configuration represented by FIG. 3 is subject to certain limitations not applicable to the label configuration of FIG. 2. Inherent in the nature of the correlation technique of this label configuration is the requirement that the individual codes in a sequence must contain a substantially greater number of bits. In the label configuration of FIG. 2, a uniform serial progression of codes can be generated by the interrogator. For the circuit of FIG. 3, such a progression is impossible because the potential developed across electrodes 67 and 68 of the correlator for many codes in such a sequence would approach the magnitude of potential developed for the correct code and result in numerous false acknowledge signals. The effect becomes more pronounced as the number of bits in a code increases. Therefore, a nonuniform, pseudo-random series of codes would be required for the label configuration of FIG. 3. A further limitation of the label configuration of FIG. 3 is the relatively short distance over which such a configuration will operate by comparison to the label configuration of FIG. 2 where the power developed in the binary coded illumination for both label configurations is substantially equal. This difference is due primarily to the power loss in transformation from an electrical signal to acoustic surface waves.

Figure 6:
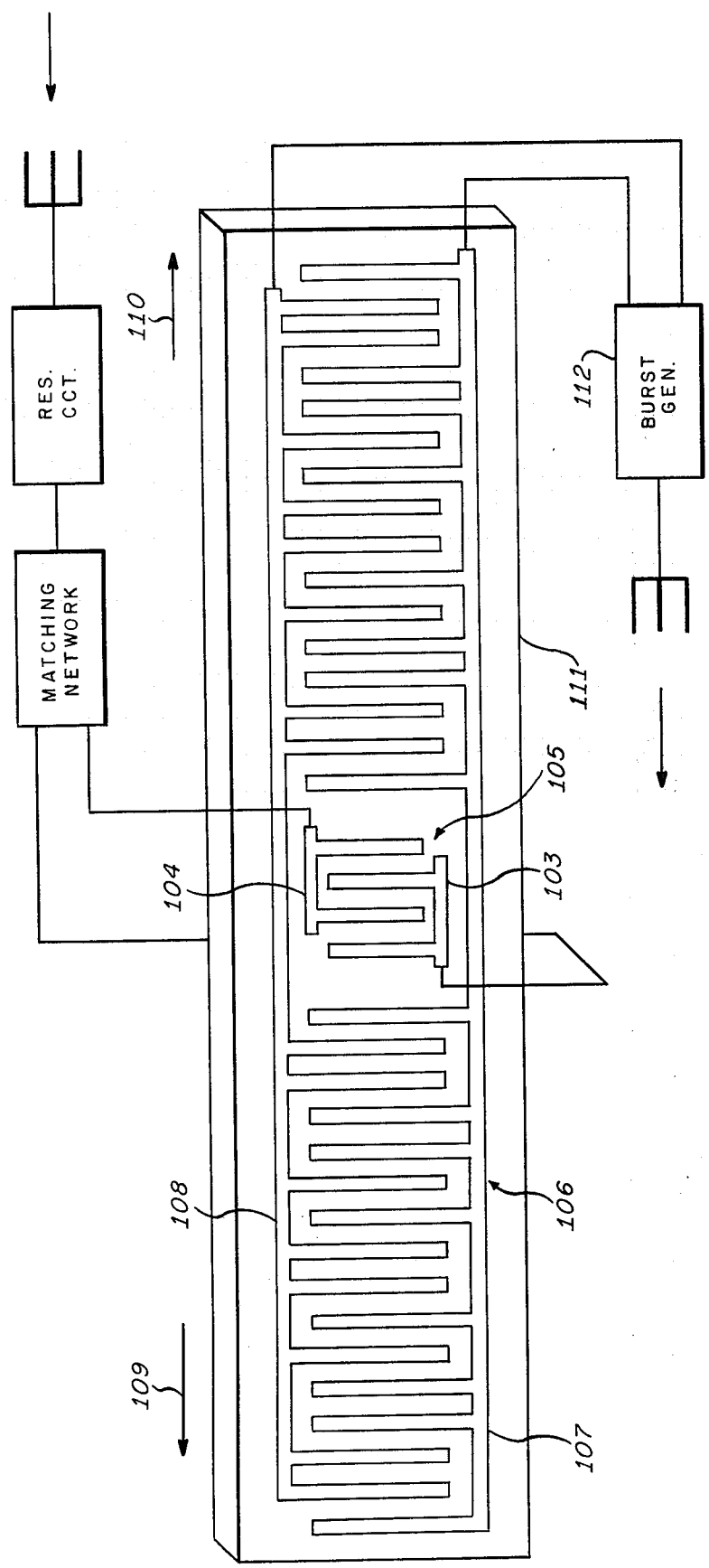
FIG. 6 is a diagram depicting a physical modification to the embodiment of the object configuration of FIG. 3.

The working distance of the label configuration of FIG. 3 may be improved to two method. FIG. 6 illustrates one such method for improving this situation. The launching transducer 105 of the label configuration of FIG. 6 is comprised of two electrodes 103 and 104 identical to electrodes 63 and 64 of FIG. 3. However, there is a notable difference in the decoder 106. Decoder 106 comprises two electrodes 107 and 108 which contain a section identical to electrodes 67 and 68 shown in FIG. 3 but, in addition thereto, contain an extension to those electrodes which comprises a section which is the mirror image of the decoder 80 depicted in FIG. 3. Decoder 106 is designed to take advantage of the fact that the launching transducer 105 will cause acoustic surface waves to propagate in the direction of arrow 109 as well as in the direction of arrow 110. With this configuration, the potential developed across electrodes 107 and 108 will be substantially greater than that developed across electrodes 67 and 68 of the label configuration of FIG. 3 causing a related increase in the power of the acknowledge signal generated by burst generator 112. This configuration, must necessarily, increase the length of the acoustic substrate 111. However, for a system in which each code contains approximately 100 bits, the total length of the acoustic substrate 111 would not exceed 6 centimeters. Although capable of operating over greater distances than the label configuration of FIG. 3, this configuration is still substantially more limited in operational distance than the configuration of FIG. 2.

Figure 7:
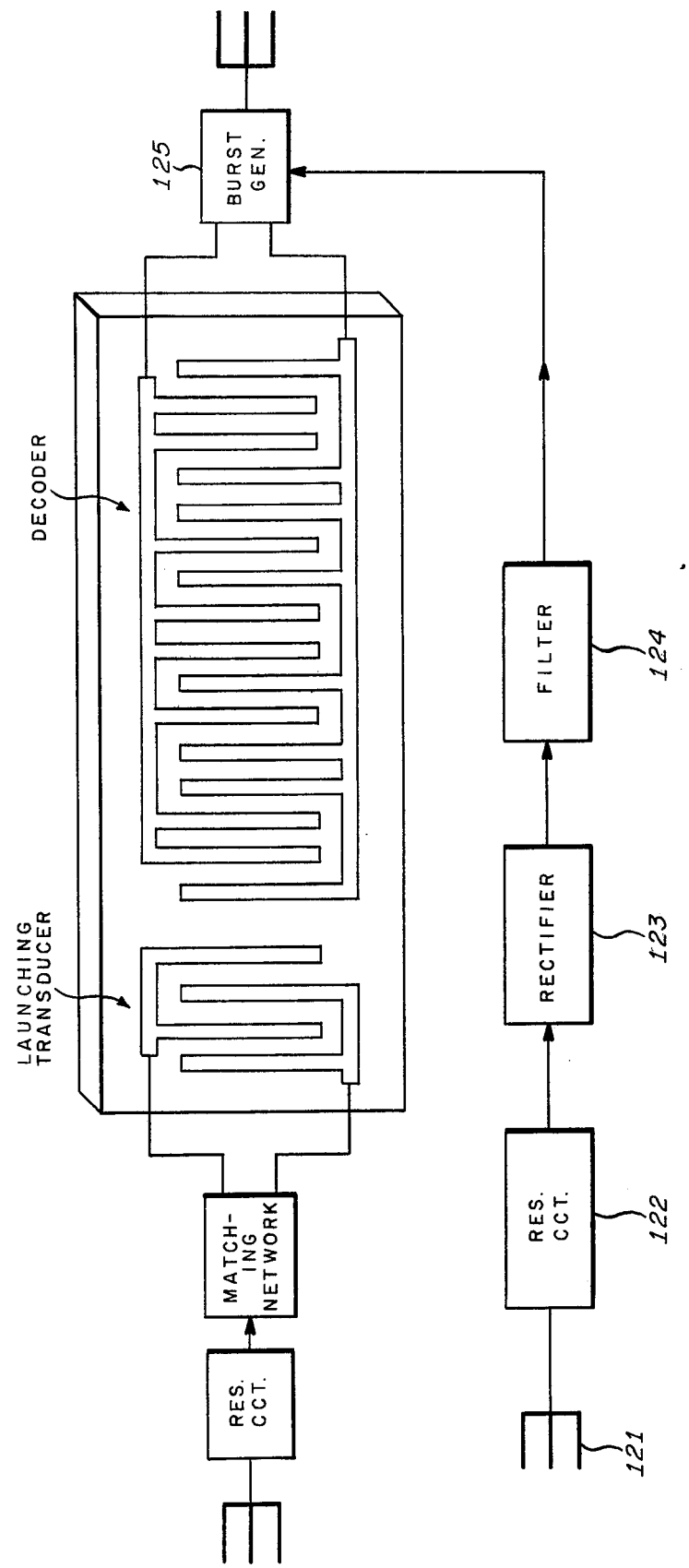
FIG. 7 is a diagram of an additional modification to the configuration of FIG. 3 in which the additional components are depicted in block diagram form.

If the circuitry used to provide d.c. power to the label configuration of FIG. 2 where incorporated with the label configuration of FIG. 3, the difference in operational distance between the two configurations would be substantially overcome. Such a configuration is depicted in FIG. 7. Antenna 121 receives an electromagnetic radiation transmitted from the interrogator 12 which is distinct from the binary coded illumination. The electromagnetic radiation collected by antenna 121 is coupled to resonant circuit 122 which is tuned to the frequency of this radiation. The output from this resonant circuit is coupled to rectifier 123 which in cooperation with filter 124 rectifies and filters this radiation to provide a d.c. power source to burst generator 125. This configuration permits burst generator 125 to generate an acknowledge signal of substantially equal power, as that generated by the label circuit depicted in FIG. 2, without otherwise affecting operation.

Still another alternative configuration could be utilized wherein a self-contained battery is incorporated to provide power to the label circuitry.

It can be appreciated that the invention is an object identification system using radio frequency signals to identify a multitude of cooperating labelled objects in a single scan. Orientation and physical location of the cooperating labelled objects is not critical in this system and, therefore, a single file procession over a well-defined path by the cooperating objects is not required. Moreover, the label is sufficiently small in size to accommodate objects of varying size and as small as packages and is further capable of being economically mass produced. Because of the relative lack of complexity in the acknowledge signal, the interrogator is substantially less complicated than prior art electromagnetic identification systems, and lends itself to use with both unsophisticated as well as complex data processing systems.

While the invention has been described in its preferred embodiment, it is to be understood that the words which have been used are words of description rather than limitation and that changes may be made within the purview of appended claims without departing from the true scope and spirit of the invention in its broader aspects.

I claim:

1. A system for identifying each object in a multitude of objects comprising:

transmitter means for illuminating each object with a first electromagnetic signal which contains a sequence of codes and wherein each object is associated with a code in the sequence;

transponder means associated with each of the objects comprising first antenna means for receiving the first electromagnetic signal containing the sequence of codes; first resonant circuit means coupled to the first antenna means and responsive to the carrier frequency of the first electromagnetic signal; demodulating means coupled to the first resonant circuit means for separating the sequence of codes from the carrier frequency; memory means for storing a preselected internal code; means, coupled to said memory means and to said demodulating means for comparing the preselected internal code with each code in the sequence and for generating a signal when a match is detected between the preselected internal code and the associated code in the sequence; and signal generator means, coupled to an output antenna means for transmitting an acknowledge signal in response to the signal from said comparing means;

receiving means responsive to the acknowledge signals for detecting coincidence between an acknowledge signal and the code in the sequency whose transmission immediately preceded receipt of the acknowledge signal, thereby identifying each object in the multitude of objects.

2. The identification system of claim 1 wherein the transmitter means comprises:

first antenna means;

means coupled to the first antenna means for generating a first carrier signal;

means for modulating the first carrier signal;

means for generating a sequence of codes, coupled to the modulating means and cooperating therewith to produce the first electromagnetic signal containing the sequence of codes for transmission by the first antenna means.

3. The identification system of claim 2 wherein the receiving means comprises:

antenna means for receiving the acknowledge signals transmitted by the transponder means;

resonant circuit means coupled to the antenna means and responsive to the frequency of the acknowledge signals;

storage means for storing the outputs from the resonant circuit means and the means for generating the sequence codes; and processor means coupled to the storage means for processing the outputs stored therein such that the presence of an acknowledge signal for each code in the sequence is detected.

4. The label identification system of claim 2 wherein:

the transmitting means further includes second antenna means and means, coupled to the second antenna means, for generating a second carrier signal wherein a second electromagnetic signal is transmitted from said transmitting means;

the transponder means includes power antenna means, power resonant circuit means coupled to the power antenna means, and rectifier and filter means coupled to the power resonant circuit means wherein the second electromagnetic signal is received and power is derived therefrom to operate said transponder means.

5. The identification system of claim 1 wherein said transponder means includes a battery to provide power thereto.

6. The identification system of claim 1 wherein said transponder means further includes means for detecting a preamble code contained within the first electromagnetic signal and preceding the sequence of codes, and synchronization means coupled to the preamble code detection means and cooperating therewith to accurately synchronize the comparison of the preselected internal code with the sequence of codes.

7. The identification system of claim 1 wherein said transponder means further includes rectifier and filter means coupled to the first resonant circuit means for providing power to the transponder means from the energy within the first electromagnetic signal.

8. A system for identifying each object in a multitude of objects comprising:

transmitter means for illuminating each object with the first electromagnetic signal which contains a sequence of codes and wherein each object is associated with a code in a sequence;

transponder means associated with each of the objects and comprising transponder first receiving means for receiving said first electromagnetic signal; a body having an active surface layer and for propagating acoustic surface waves, said active surface layer having piezoelectric properties; launching transducer means coupled between said transponder receiver means and the active layer surface of said body for converting the sequence of codes to acoustic surface waves and launching the same along said active surface layer means; a plurality of electrode finger pair means disposed on the active surface layer wherein the fingers of each electrode finger pair means are positioned to form a preselected internal code and wherein potential is developed across the electrode finger means in response to the acoustic waves propagating along the active surface layer; means for summing the total potential developed across the plurality of electrode finger pair means wherein the total potential is indicative of the comparison between the internal code and the sequence of codes and wherein the magnitude of the total potential substantially increases at the point when a match is detected, that is, when the corresponding code in the sequence propagating along the active surface layer properly aligns with the plurality of electrode finger pair means; and first resonant circuit means coupled to an output antenna means for generating an acknowledge signal in response to the total potential from said summing means at the point when the corresponding code in the sequence is detected thereby; and receiving means responsive to the acknowledge signals for detecting coincidence between an acknowledge signal and the code in the sequence whose transmission immediately preceded receipt of the acknowledge signal, thereby identifying each object in a multitude of objects.

9. The identification system of claim 8 wherein said transponder receiver means includes:

first antenna means for receiving the first electromagnetic signal containing the sequence of codes;

second resonant circuit means coupled to the first antenna means and responsive to the frequency of the first electromagnetic signal;

matching network means for providing proper coupling between the first resonant circuit means and the launching transducer means.

10. The identification system of claim 8 wherein the fingers of each electrode finger pair means are spaced apart from each other and from adjacent fingers of adjoining electrode finger pair means by a distance of one-half the acoustical wavelength of the frequency of the sequence of codes.

11. The identification system of claim 8 wherein the means for summing the potential developed across the electrode finger pair means comprises first and second electrodes wherein the first electrode is coupled to one finger of each electrode finger pair means and the second electrode is coupled to the remaining finger of each electrode finger pair means.

12. The identification system of claim 11 wherein said transmitter includes modulator means whereby the first electromagnetic signal is comprised of a phase modulated R.F. signal wherein said phase-modulation is arranged such that it represents said sequence of code in binary form.

13. The identification system of claim 12 wherein the positioning of the fingers of each electrode finger pair means to form the preselected internal code comprises coupling the finger closest to the launching transducer means of each electrode finger pair means representing a binary ONE to the first electrode of the summing means; and coupling the finger closest to the launching transducer means in each electrode finger pair means representing a binary ZERO to the second electrode of the summing means.

* * * * *